United States Patent [19]

Shindeldecker

[11] Patent Number: 4,823,500
[45] Date of Patent: Apr. 25, 1989

[54] OSCILLATING LURE

[76] Inventor: Walter E. Shindeldecker, 505 W. Yates Ave., Findlay, Ohio 45840

[21] Appl. No.: 116,705

[22] Filed: Nov. 4, 1987

[51] Int. Cl.⁴ ............................................. A01K 85/00
[52] U.S. Cl. .................................. 43/42.13; 43/42.22; 43/44.81
[58] Field of Search ................ 43/42.11, 42.22, 42.39, 43/44.81, 44.43, 42.13, 42.31

[56] References Cited

U.S. PATENT DOCUMENTS

| | | | |
|---|---|---|---|
| 2,734,301 | 2/1956 | Fuqua | 43/42.11 |
| 2,778,144 | 1/1957 | Jones et al. | 43/42.11 |
| 3,803,747 | 4/1974 | Cartwright | 43/42.28 |
| 3,828,463 | 8/1974 | Perrin | 43/42.11 |
| 4,161,838 | 7/1979 | Gapen | 43/42.11 |
| 4,510,710 | 4/1985 | Hanna et al. | 43/42.13 |
| 4,551,940 | 11/1985 | East | 43/42.13 |
| 4,640,041 | 2/1987 | Stanley | 43/42.13 |
| 4,718,191 | 1/1988 | Gentry | 43/42.13 |

Primary Examiner—Nicholas P. Godici
Assistant Examiner—Karen Skillman
Attorney, Agent, or Firm—David C. Purdue; John C. Purdue

[57] ABSTRACT

A fishing lure comprising a V-shaped body, a weight supported on one arm of the body, and a spherical member supported on the other arm of the body is disclosed. When the lure is retrieved through the water, the spherical member imparts a side-to-side motion to the lure.

12 Claims, 1 Drawing Sheet

OSCILLATING LURE

BACKGROUND OF THE INVENTION

1. Field of the Invention

This invention relates generally to a fishing lure provided with a floating member which gives the lure a self-righting action in the water. More specifically, the invention relates to such a lure wherein the shape of the floating member and the manner in which it is secured to the lure cause the lure to exhibit a fish attracting motion as it is pulled through the water.

2. Description of the Prior Art

U.S. Pat. No. 3,828,463 discloses a fishing lure having a floater body member and a line shank extending forwardly and downwardly therefrom to an eye for connection of a fishing line. A weight member is mounted on a weight support shaft which extends rearwardly from the eye. A hook is secured to the line shank in substantially co-planar relationship with the line shank and the weight support shaft. The weight member and the floater body member serve to stabilize the lure in an upright position when the lure is in water and to avoid or prevent fouling of the hook.

U.S. Pat. No. 3,803,747 discloses a fishing lure with a weighted body, a buoyant member pivotally attached to the body near the rear thereof, and a hook attached by a swivel connection at the rear of the body. The buoyant member maintains the hook in a vertical plane when the lure is in water thereby reducing the possibility of snagging. Snagging is further resisted by the substantially horizontal orientation of the body member, which orientation is also attributable to the buoyant member.

SUMMARY OF THE INVENTION

The present invention is based upon the discovery of an improved fishing lure including a float for maintaining the lure in a substantially upright position. According to the invention, a bulbously shaped float is secured to an upper arm of a V-shaped wire member and a lower arm of the wire member is weighted. A hook is supported on the lower arm in substantially co-planar relationship with the wire member. These elements are arranged so that, when the lure is at rest in the water, it is maintained in a substantially vertical, snag-free orientation and so that, when the lure is retrieved through the water, the upper arm of the wire member exhibits a substantial side-to-side, fish-enticing oscillation. Preferably, a spinner or other lure dressing is releasably supported on the upper arm of the wire member.

DETAILED DESCRIPTION OF THE INVENTION

Figure 1:
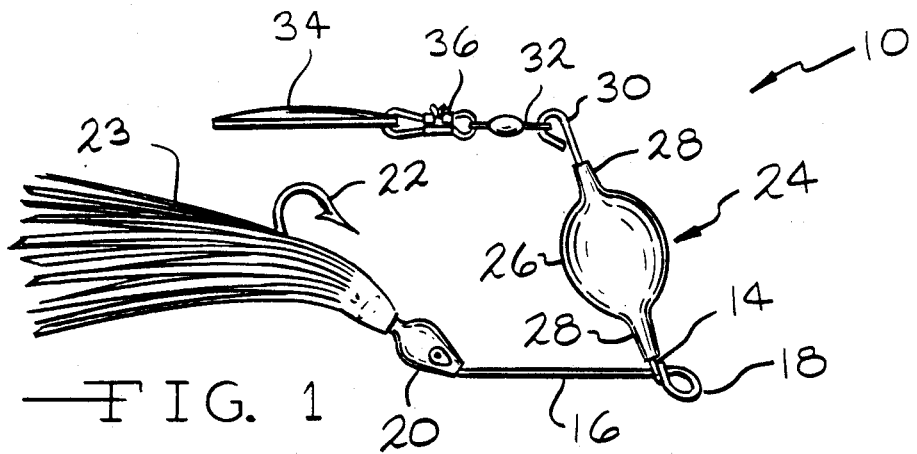
FIG. 1 is a side view of a preferred embodiment of a fishing lure according to the present invention.

With reference to FIG. 1, a fishing lure according to the preferred embodiment of the present invention is indicated generally at 10. The lure 10 comprises a V-shaped wire member having an upper arm 14, a lower arm 16 and an eye 18. The lure 10 is adapted to be connected, in a known manner, to a line (not illustrated) at the eye 18. The eye 18 is at the junction of the upper and lower arms 14 and 16 where a portion of the V-shaped wire member has been wrapped around the lower arm 16, thereby forming the eye 18. The lower arm 16 is weighted in this embodiment by a weight member 20. A hook 22 is connected to the lower arm 16 and extends rearwardly therefrom and from the weight member 20. A rubber hula skirt 23 is frictionally retained on the weight member 20 and covers a portion of the hook 22.

A float member 24 is supported on the upper arm 14 of the V-shaped wire member. The float member 24 has a predominantly bulbously-shaped central portion 26 and substantially tubularly-shaped ends 28. The float member 24 is retained on the upper arm 14 between the eye 18 and a loop 30 formed on the upper arm 14. A snap swivel 32 is retained on the loop 30 and there is a spinner blade 34 retained by a snap portion 36 of the swivel 32. The spinner blade 34 is provided on the lure 10 in accordance with the preferred embodiment of the present invention because it is believed that the spinner blade 34 will enhance the chance that a fish will strike. However, the self-righting feature and the side-to-side oscillating feature of the invention are achieved with and without the spinner blade 34. The snap swivel 32 is a preferred means for connecting the spinner blade 34 to the lure 10 because the snap portion 36 allows one to remove the spinner blade 34 and to substitute various spinner blades therefor without the need for tools.

Figure 2:
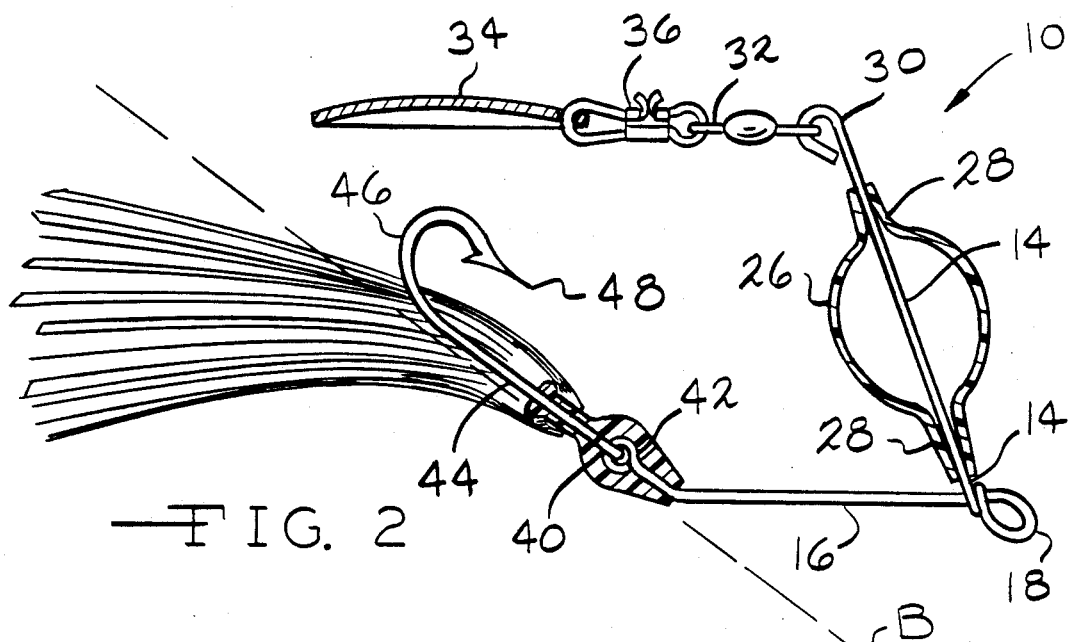
FIG. 2 is a sectional view of the lure illustrated in FIG. 1.

With reference to FIG. 2, connections between some of the elements of the lure 10 are shown in detail. The hook 22 has a conventional eye 40 at one end. The lower arm 16 of the V-shaped wire member terminates in a hook-shaped portion 42 which passes through the eye 40 of the hook 22. The weighted member 20 constitutes a body of lead which has been cast around the connection between the eye 40 and the hook-shaped portion 42 of the lower arm 16. The hardened lead provides a rigid connection between these elements so that the position of the hook 22 is fixed, relative to the arm 16.

The hook 22 has a shank 44 which extends from the eye 40 to a curved portion 46 and terminates in a free end 48. As shown in FIGS. 1 and 2, the hook 22 is oriented, relative to the lure 10, so that the curved portion 46 is substantially co-planar with the V-shaped wire member 12 and the free end 48 is on the same side of the hook shank 44 as is the upper arm 14. It will be appreciated that slight rotation of the hook 22 relative to the lower arm 16 can be tolerated. Accordingly, the hook 22 can be fastened to the arm 16 by means other than those illustrated in FIG. 2, so long as the hook is maintained in substantially co-planar relationship with the arms 14 and 16 of the wire member, preferably with the free end 48 on the same side of the shank 44 as the upper arm 14.

The float member 24 is slidably mounted on the upper arm 14 of the V-shaped wire member. The float member 24 is preferably made of a plastic and is illustrated as being hollow, although it need not be. Indeed, the float member can be solid if it is composed of a material having a density less than that of water. The float member 24 has a longitudinal axis which coincides with the upper arm 14. In other words, the float member 24 is substantially concentric about the upper arm 14. The tubularly-shaped ends 28 of the float member 24 support it on the arm 14. Movement of the float member 24 relative to the upper arm 14 is limited to rotation thereabout and sliding thereon between the eye 18 and the loop 30. However, the self-righting feature and the side-to-side oscillating feature are achieved in a lure wherein a bulbous float member is fixed to an upper arm so that there is no relative movement provided for between these elements. In the illustrated embodiment, there is very little play between the arm 14 and the tubularly-shaped ends 28 of the float member 24. Consequently, water is prevented from passing into the inside of the float member 24.

The float member 24 has a buoyancy in water such that the lure 10, when at rest, will assume an upright position, relative to a lake bottom B, for example, corresponding approximately with the position illustrated in FIG. 2. The buoyancy of the float member 24 can be adjusted relative to the weight of the other components of the lure 10 including the weight member 20 so that the lure 10 will sink or float. The lure 10 illustrated in the drawings is a sinking lure. In a sinking lure according to the invention, the buoyancy of the float relative to the weight of the lure can be controlled so that the lure sinks in water at a desired rate.

Figure 3:
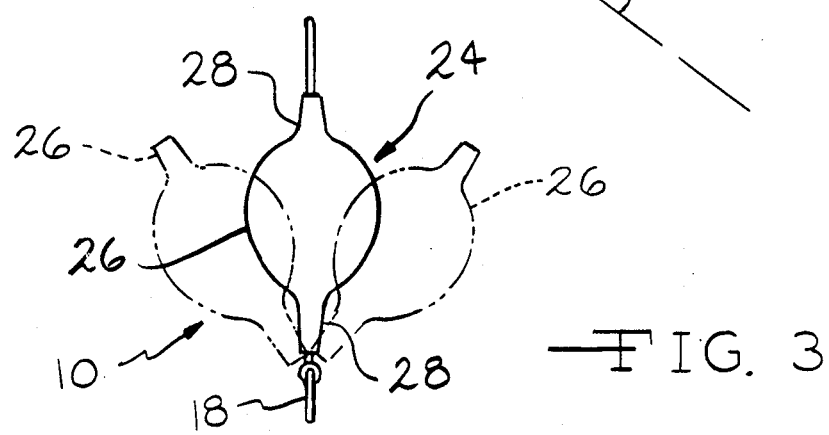
FIG. 3 is a front view of the lure shown in FIGS. 1 and 2 and illustrating the side-to-side oscillating motion of the lure as it is retrieved through the water.

With reference to FIG. 3, the lure 10 is illustrated in solid lines in an upright position such as it would assume when at rest in water. As the lure 10 is retrieved through water, however, the lure 10 oscillates between the positions represented by the phantom lines. The exact reason for the oscillation is not known at this time but some modifications to the lure 10 have been made to examine their effect, if any, on the oscillation. For example, the angle between the arms 14 and 16 has been reduced to approximately thirdy degrees and enlarged to well over ninety degrees without significantly diminishing the oscillation of the lure 10. In addition, the spinner blade 34 has been removed from the lure 10, without detracting from the oscillation. An egg-shaped float made of plastic has been substituted in a lure otherwise corresponding substantially with the lure 10. In this modification, the self-righting feature and the oscillation feature were observed but the oscillation was somewhat reduced by comparison with the oscillation observed for the illustrated lure 10 with a more bulbously shaped float member 24. In another modification, a balsa wood float member was substituted in a lure substantially like the lure 10. Finally, a rounder, more spherical version of the float member 24 was substituted for the float member 24. In this case, the self-righting feature was maintained and the oscillating feature was enhanced by comparison with the oscillation of the lure 10. Other modifications will occur to those skilled in the art, and such modifications may be resorted to without departing from the spirit and scope of the invention disclosed herein and claimed below.

I claim:

1. A fishing lure comprising, in combination,
   a V-shaped wire member having first and second ends,
   line attaching means connected to said wire member between said first and second ends,
   hook means including a shank having a free end and an end including attachment means such as an eye, said attachment means being connected to the first end of said wire member so that said free end is between said shank and said second end of said wire member,
   weight means connected to and supported on said lure between the line attaching means and the free end of said hook means,
   a bulbous member mounted on said wire member between said line attaching means and said second end of said wire member, said bulbous member having an outer surface which is substantially spherical, said outer surface being spherical to the extent that when the lure is retrieved through the water, said outer surface imparts a substantial side-to-side motion to said second end of said wire member, relative to said first end of said wire member, so that the lure oscillates, and
   retaining means connected to said wire member for retaining said bulbous member on said wire member.

2. The lure claimed in claim 1 wherein said bulbous member comprises a hollow plastic member with two tubular ends extending therefrom and wherein said wire member passes through said tubular ends.

3. The lure claimed in claim 1 wherein said weight means comprises lead which has been cast about the connection between the hook means and the first end of said wire member.

4. The lure claimed in claim 1 and further including a snap swivel connected to said second end of said wire member for releasably connecting a spinner blade to the lure.

5. A fishing lure comprising
   line attaching means,
   first and second shafts connected to and extending from said line attaching means to form a V-shaped body having first and second free ends,
   a hook comprising a shank and a free end, said hook being connected to said first free end of said body so that said free end of said hook is generally between said hook shank and said second shaft,
   a weight connected to and supported on said first shaft away from said line attaching means,
   a bulbous substantially spherical member concentrically mounted on said second shaft and
   means for retaining said bulbous member on said second shaft
   wherein, the bulbous member is sized and shaped and sufficiently spherical so that, when the lure is retrieved through water, the second shaft oscillates substantially relative to the first shaft.

6. The lure claimed in claim 5 wherein said bulbous member comprises a hollow plastic member with two tubular ends extending therefrom and wherein said second shaft passes through said tubular ends.

7. The lure claimed in claim 5 wherein said weight comprises lead which has been cast about the connection between the hook and the first shaft.

8. The lure claimed in claim 7 and further including a snap swivel connected to said second shaft for releasably connecting a spinner blade to the lure.

9. A fishing line comprising
   line attaching means
   first and second shafts connected to and extending from said line attaching means to form a V-shaped body having first and second free ends,
   a hook connected to said first free end of said body,
   a weight connected to and supported on said first shaft away from said line attaching means,
   a bulbous substantially spherical float concentrically mounted on said second shaft and means for retaining said float on said second shaft, wherein, when the lure is at rest in water, said float acts to maintain the V-shaped body in a vertical orientation and wherein said float is sufficiently spherical that, when the lure is being retrieved, said float causes said second shaft to oscillate from side-to-side relative to said first shaft.

10. The lure claimed in claim 9 wherein said bulbous float comprises a hollow plastic member with two tubular ends extending therefrom and wherein said second shaft passes through said tubular ends.

11. The lure claimed in claim 9 wherein said weight comprises lead which has been cast about the connection between the hook and the first shaft of the body.

12. The lure claimed in claim 9 and further including a snap swivel connected to said second shaft of said body for releasably connecting a spinner blade to the lure.

* * * * *